UNITED STATES PATENT OFFICE.

JOHN R. MARDICK, OF NEW YORK, N. Y.

NITRO AROMATIC COMPOUND AND PROCESS OF MAKING SAME.

1,225,347. Specification of Letters Patent. Patented May 8, 1917.

No Drawing. Application filed June 6, 1916. Serial No. 101,920.

*To all whom it may concern:*

Be it known that I, JOHN R. MARDICK, a citizen of the United States, and residing in New York, county and State of New York, have invented new and useful Improvements in Nitro Aromatic Compounds and Processes of Making Same, of which the following is a specification.

My invention relates to the manufacture of nitro compounds from tars, and has for its object the production of such compounds by a simple and expeditious method from various tars or mixtures thereof, all without preliminary purification or separation.

A further object of my invention is the utilization of an impure tar or mixtures of impure tars and also the production from such materials of relatively large quantities of nitro compounds highly suitable for the production of safety explosives, as well as a substitute in many cases for tri-nitro-toluene, and also which serves as a very efficient yet economical ingredient of safety explosives.

I am aware that it has heretofore been proposed to nitrate such a material as solvent naphtha after the removal therefrom of acid and basic components, or of bodies which become resinous with sulfuric acid, such as set forth in Patent No. 898,144 of September 8, 1908. This patent refers to the fact that the nitration of impure tar oil or raw solvent naphtha, while it has been attempted, has heretofore resulted in the production of but a small yield of nitro compounds, and these were contaminated with various by-products so as to render the same quite unsuitable for the production of a safety explosive on account of their impurity.

An example of the preferred method of procedure employed by me is as follows:—

Since any suitable apparatus may be used for carrying out the process, and such apparatus is easily obtainable and well understood by those skilled in the art, the same forms no part of my invention, and is not claimed herein.

I may start with a tar or mixtures of tars as distinguished from the entire distillate or entire distillates thereof, in order to obtain a product herein termed product D, which is highly suitable (in the manufacture of black powder) as a substitute for sulfur and carbon, also for the manufacture of ordnance powder as hereinafter described.

The process of treating these mixed tars is as follows: 1 part by weight of a tar or a mixture of tars, and ¼ part of relatively weak nitric acid, preferably 1.32 S. G. are mixed together in the nitrating pot while maintaining the temperature, during constant stirring of the mixture, preferably between 30° and 40° C., the nitration continuing for approximately one hour. Then to this mixture is gradually added with constant stirring, ¼ part of nitric acid, preferably about 1.36 S. G. and ½ part of the same acid of about 1.42 S. G., and ½ part of same acid of 1.50 S. G., the temperature being substantially maintained preferably between 30° C. and 40° C., and the addition of the nitric acid requiring 2 to 3 hours with constant stirring by mechanical or air-blowing means or otherwise. Then 2 parts by weight of sulfuric acid of about 1.84 S. G. are added, with constant stirring, and the temperature is controlled in such a manner that during a period of three hours it will gradually rise from 40° to 80° C., the addition of the acid being so conducted as to require about three hours. When all the sulfuric acid has been added the mixture is stirred for about two or three hours, or if desired the mixture is allowed to stand over night as it will not generate further heat and will gradually cool, the stirring being continued throughout the full digestion period in order to prevent caking which not only interferes with reaction but which would increase the danger of explosion.

At the end of the digestion period it will be found that the mass is divided into two layers, the lower comprising a mixed acid bath and the upper layer light lumps of solid material which may be easily disintegrated to a flour-like powder. This is accomplished by first draining off the acid bath and then washing with water and neutralizing with a suitable alkali such as finely powdered magnesium carbonate or dolomite. The mass so obtained is then disintegrated in a suitable mill in the presence of water wherein it is further washed and disintegrated gradually.

The yield of product D comprises about 125% of the amount of the oil content of the tar employed.

Product D may be used in admixtures with nitrates or a minor percentage of perchlorates to form powder resembling black powder. It may also be used to manufacture ordnance or sporting powders by combining therewith a major percentage of perchlorates. Product C may be added to the present smokeless powder in order to render the same more stable, thus materially reducing the cost thereof.

The regulation of the temperature control is of the utmost importance in carrying out the manufacture of the herein described products. As neither the tars nor their distillates are good conductors of heat, there is no substantial distribution of the heat of reaction throughout the mass unless effective stirring is maintained. Furthermore, since the reaction is rapid and violent in the first stages of the nitration, the temperature unless artificially controlled will soar with the consequence that the products of nitration become gummy or resinous and cling to the sides of the nitrating pot, thus acting as an objectionable insulator to the cooling medium circulating around the pot.

Preferably the air used for cooling is refrigerated to free it from moisture by the well known Gayley process as employed in the steel industry.

Because of the almost innumerable different products in the tar entire distillates the nitration of which is effected, the resultant product has no definite composition or melting point such as tri-nitro-toluene or picric acid would have. On the other hand, the products so obtained possess the characteristics and advantages of many of the well known nitro compounds of the aromatic series of hydrocarbons. These products produce powders which are extremely stable as herein stated, and which usually require a fulminate cap to effect the explosion thereof. Moreover as is evident, product D will possess an extremely high free carbon content.

While I preferably employ temperatures below 40° C. in one instance, above 15° or 80° C. and 100° C. in other instances, I do not confine myself to these exact temperatures, and in the claims have purposely used the limits of 10° C., 60° C., 90° C. and 105° C., instead of 40° C., 80° C., and 100° C.

In producing product D if desired, in lieu of using the mixed acids, the nitric acid can be first added gradually to the materials to be nitrated and then the desired amount of sulfuric acid added separately.

Wherever the term "parts" is used I refer to parts by weight.

Having thus described my invention, what I claim and desire to secure by Letters Patent is:—

1. The process of preparing nitro compounds from tar which consists in first nitrating impure tar or tars in a relatively weak mineral acid bath while agitating said mixture and maintaining the temperature below 60° C. and above 10° C.; then increasing the strength of said bath by adding thereto relatively strong nitric acid while maintaining the temperature below 60° C.; then raising the temperature of said bath while still constantly agitating the mixture to a point in excess of 70° C. and not exceeding 90° C. and maintaining such elevated temperature for a prolonged period of time until substantial reaction has been effected, then permitting the mass to settle and separate into two layers, separating the lower acid layer from the upper substantially solid layer, then dissolving the solid mass so obtained in relatively strong nitric acid while maintaining the temperature between 30° and 60° C., then adding fuming sulfuric acid and heating the mixture to a temperature in excess of 95° C. and not exceeding 105° C., and maintaining such temperature for a sufficient time to effect high nitration.

2. The process of preparing nitro compounds from tar which consists in first nitrating impure tar or tars in a relatively weak mineral acid bath while agitating said mixture and maintaining the temperature below 60° C. and above 10° C.; then increasing the strength of said bath by adding thereto relatively strong nitric acid while maintaining the temperature below 60° C.

3. The process of preparing nitro compounds from tar which consists in first nitrating impure tar or tars in a relatively weak mineral acid bath while agitating said mixture and maintaining the temperature below 60° C. and above 10° C.; then increasing the strength of said bath by adding thereto relatively strong nitric acid while maintaining the temperature below 60° C.; then raising the temperature of said bath while still constantly agitating the mixture, to a point in excess of 70° C. and not exceeding 90° C. and maintaining such elevated temperature for a prolonged period of time until substantial reaction has been effected, then permitting the mass to settle and separate into two layers, and separating the lower acid layer from the upper substantially solid layer.

Signed at New York, county and State of New York, this 5th day of June, 1916.

JOHN R. MARDICK.